INVENTOR.
RALPH R. DIMMICK
BY
Louis J. Knobbe
ATTORNEY

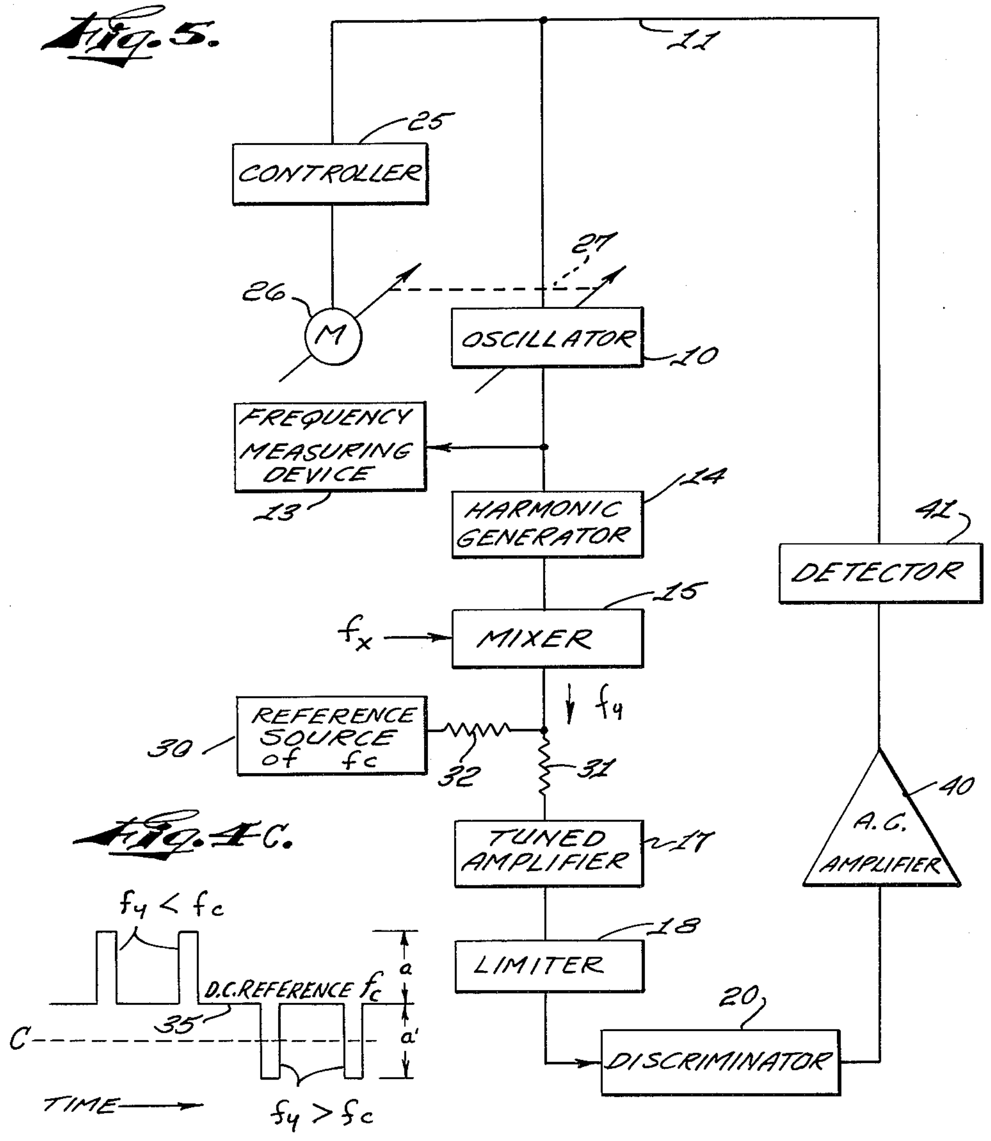
Fig. 5. Fig. 4C.
Fig. 4A & B.
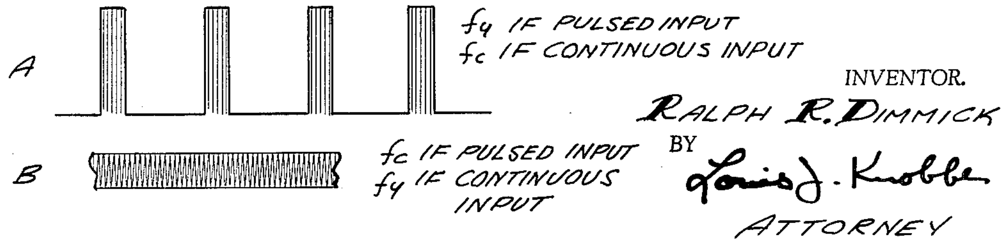
INVENTOR.
RALPH R. DIMMICK
BY
Louis J. Knobbe
ATTORNEY United States Patent Office
3,218,572
Patented Nov. 16, 1965

3,218,572

FREQUENCY DETECTION SYSTEM COMPENSATED AGAINST DISCRIMINATOR DRIFT

Ralph R. Dimmick, Kensington, Calif., assignor to Beckman Instruments, Inc., a corporation of California Filed Oct. 25, 1962, Ser. No. 233,097
11 Claims. (Cl. 331—17)

The present invention relates to frequency detection systems and, more particularly, to an improved frequency detection system whose output accuracy is substantially unaffected by a drift of the discriminator center frequency.

Frequency discriminators or detectors translate variations of frequency into variations of amplitude. In certain applications, it is imperative that the discriminator accurately indicate the variation in frequency of the input signal from a predetermined frequency value. In the typical detector, the output signal represents the frequency variation from a discriminator center frequency determined by capacitively tuned transformer windings. Slight changes in the electrical values of these components cause this center frequency to increase or decrease slightly, i.e. the center frequency is caused to drift so that the frequency discriminator output is no longer referenced to the original center-frequency value.

A specific example in which the aforementioned drift creates a significant problem is in the frequency locked, frequency measuring system. In such a system, the frequency output of a variable frequency is mixed with an input signal of unknown frequency and the resultant difference frequency amplified in a tuned amplifier and detected in a frequency discriminator having a predetermined center frequency. The discriminator output signal is used to control the variable oscillator output at a value such that the difference frequency is maintained at the center frequency of the discriminator. The variable oscillator output is measured by an accurate frequency measuring device such as a decade counter which provides an output value bearing a known relationship to the unknown frequency input.

The accuracy of the frequency measuring system described above is dependent upon the stability of the discriminator center frequency since the output of the variable oscillator will be caused to change by a drift in the output of the frequency discriminator.

It is therefore an object of the present invention to provide a frequency discriminator having an extremely stable output regardless of center frequency drift.

Another object of the present invention is to provide an improved frequency locked, frequency measuring system which compensates for drift of the center frequency.

A further object of the present invention is to provide a system for very accurately measuring the frequency of a pulse modulated input signal.

Other and further objects, features and advantages of the invention will become apparent as the description proceeds.

Briefly, in accordance with a preferred form of the present invention, there is provided an improved frequency detection system for determining the frequency of a pulsed-wave input signal comprising means for supplying both the unknown pulsed-wave input signal and a continuous-wave reference signal through a limiter circuit to the input of a representative prior art frequency discriminator circuit. The frequency of the continuous-wave reference signal is at or near the center frequency of the discriminator and its magnitude is held substantially below the level of the pulsed-wave input of unknown frequency. The limiter acts upon these two signals so that the discriminator receives only the larger magnitude pulsed-wave signal when it is present. In the interval between the pulses, the discriminator output is determined by the continous-wave reference signal. As a result, there is provided at the output of the discriminator a direct current level corresponding to the position of the continuous-wave input signal with respect to the discriminator center frequency. As the pulses arrive, they appear at the output of the discriminator as positive or negative pulses with respect to the direct current level. The amplitude of these pulses provides a precise measurement of the variation in frequency of the pulsed-wave input signal with respect to the continuous-wave reference signal. Since the pulse amplitudes are measured with respect to the D.C. level provided by the reference frequency source, the discriminator output is independent of discriminator drift.

Frequency detection systems constructed in the manner described may be used to provide very accurate frequency locked, frequency measuring systems. One such system is described hereinafter. Also, the frequency detection system described above may be modified for measuring the frequency of a continuous-wave input by substituting a pulsed-wave reference source for the continuous-wave reference source. The amplitude of the discriminator output pulses is then a precise measurement of the frequency variation of the continuous-wave input with respect to the frequency of the pulsed-wave reference.

A more thorough understanding of the invention may be obtained by a study of the following detailed description taken in conjunction with the accompanying drawings in which.

Figure 3:
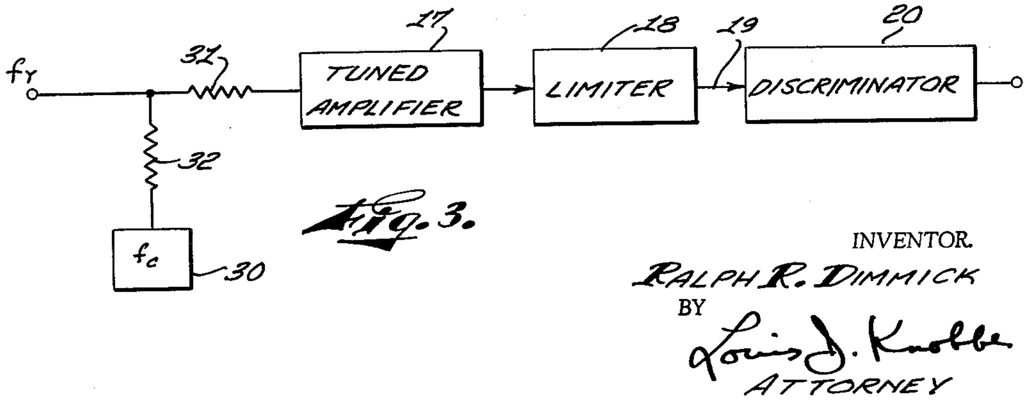
FIG. 3 is a block diagram of an improved frequency detection system constructed in accordance with this invention.

FIGS. 4A, B and C illustrate wave forms at the inputs and output of the system of FIG. 3; and FIG. 5 is a block diagram of a frequency locked, frequency measuring system employing the teachings of this invention.

*A prior art frequency, locked, frequency measuring system*

Figures 1, 2:
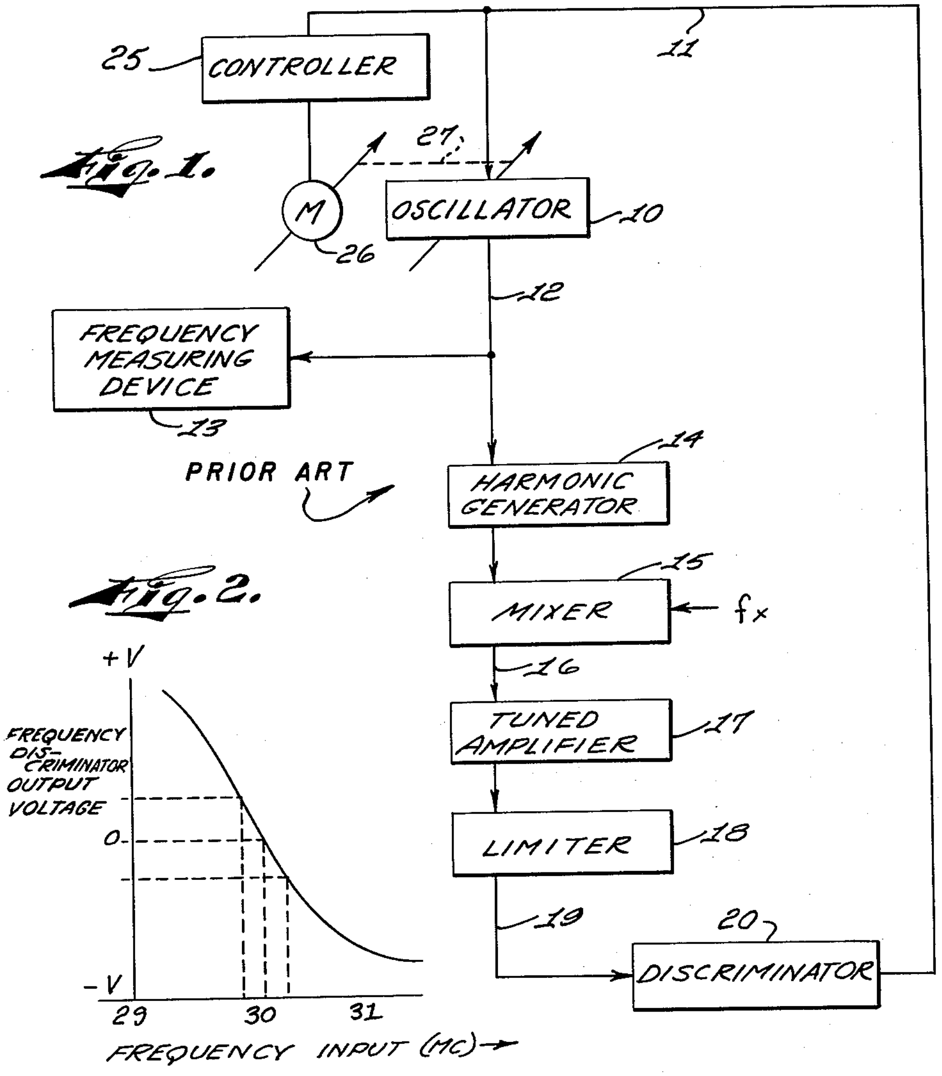
FIG. 1 is a block diagram of a representative prior art frequency locked, frequency measuring system.
FIG. 2 is a discriminator output voltage versus frequency input curve illustrating the effects of center frequency drift.

Referring now to FIG. 1, there is shown a prior art frequency measuring system comprising a variable oscillator 10 controlled by a feedback signal on lead 11. The oscillator output 12 is applied to a frequency measuring device 13 and also a harmonic generator 14 adapted to generate harmonic frequencies well above the upper frequency limit of the base frequency generated by oscillator 10. The high frequency harmonic output signal of generator 14 is mixed with the input signal $f_x$ of unknown frequency in mixer 15 to supply a difference frequency signal at the mixer output 16.

In a simplified, operator controlled frequency measuring system, the oscillator 10 is manually varied until the difference frequency at the mixer output has a frequency of 0 c.p.s. Assuming that one can obtain a true zero frequency beat, the unknown frequency may then be calculated by multiplying the frequency measured by frequency measuring device 13 by the harmonic number at which the zero beat is achieved. A serious disadvantage of this simplified system is that it is difficult to detect the true zero frequency beat. Thus, the beat signals may often be in the microvolt region for which it is quite difficult to provide an amplifier through which the output beat may be amplified from the D.C. frequency level. Consequently, A.C. coupled amplifiers are generally used having a typical low frequency cut off of the order of 100 c.p.s. The exact point of zero frequency beat is then impossible to measure thus giving rise to a possible error of approximately one part in $10^7$ when $f_x$ is in a 1,000 megacycle region.

Another disadvantage of the simplified system described above is that there may be a time delay between the observation of the zero beat and the measurement of the oscillator frequency, particularly in those systems employing a digital counter as a measuring device. If during the measuring interval the oscillator drifts, another error is introduced in the frequency measurement.

In order to increase both the speed and accuracy of the measuring procedure, the frequency locking feedback loop is included in the system of FIG. 1. This loop comprises a tuned intermediate frequency amplifier 17 and limiter 18 coupling the output 16 of mixer 15 to the input 19 of a frequency discriminator 20. The output of the frequency discriminator is applied via lead 11 directly to the oscillator 10 and also thereto via controller 25, motor 26 and mechanical link 27. These latter control components are included since it is difficult to change a high accuracy oscillator very far percentagewise solely by means of a changing voltage input. In the system shown, when the frequency change detected by discriminator 20 exceeds a predetermined amount, controller 25 operates motor 26 to change the frequency output of oscillator 10 in the appropriate direction thereby greatly extending the possible percentage frequency change of the oscillator.

The feedback loop of the system of FIG. 1 maintains the difference frequency output of mixer 15 at the center frequency of the discriminator 20, not at a zero frequency beat. This intermediate frequency beat is obtained by passing the amplified and amplitude limited difference frequency into the frequency discriminator 20 which generates an error voltage upon lead 11 when the difference frequency differs from the center frequency of the discriminator. This error voltage is applied to the oscillator 10 to vary its frequency output until the difference frequency is very close in valve to the discriminator center frequency. In making the actual frequency measurement, an account must be made for the discriminator center frequency since the frequency counter or the frequency measuring device 13 will read high by this amount. Means may be conveniently built into the counter to automatically subtract this frequency so that the operator need only multiply the frequency shown by the harmonic number as in the simplified system described above.

A significant corollary of the frequency locked, frequency measuring system is that the frequency measuring device 13 will provide a continuous record of the performance of the frequency source under test without an operator in attendance taking successive zero beats with time. Consequently, the disadvantages described above of an operator adjusted system are substantially obviated by introducing frequency lock in the manner shown.

*A source of error in the frequency locked, frequency measuring system*

Although frequency locking at a beat frequency substantially above 0 c.p.s. greatly improves the performance of the frequency measuring system, the system accuracy is now dependent upon the accuracy of the frequency discriminator center frequency. Referring to FIG. 2, there is shown a representative discriminator input voltage-output frequency curve in which for purposes of illustration the center frequency is assumed to be 30 megacycles. As shown, frequency inputs above the center frequency produce proportional negative voltage outputs over the range of the discriminator whereas frequency inputs below the center frequency produce proportional positive voltage outputs over the discriminator operating range. Note, however, that if the discriminator center frequency drifts (as shown by the dotted lines), the discriminator output voltage is caused to change which in turn produces a different oscillator output frequency. This change in oscillator frequency is measured by the frequency measuring device 13 as though it was a change of the input frequency $f_x$. Consequently, drift of the discriminator center frequency effects an erroneous frequency measurement.

Discriminator drift is an especially acute problem when the unknown input signal comprises a pulse modulated RF signal. Narrow pulses require that the discriminator frequency band width be wide. The discriminator's center frequency must therefore be relatively high, e.g. 30 megacyles, resulting in a center frequency subject to substantial drift.

*A substantially drift-free frequency detection system*

In FIG. 3, there is shown an improved frequency detection system which compensates for discriminator drift. Moreover, this system is particularly adapted for input signals of the form shown in FIG. 4A comprising discrete pulses of RF energy. Such signals are commonly known in the art as pulsed-wave or pulsed RF signals. In FIGURE 3, those components which may be identical to those described above bear the same identification numerals. In this improved system, the unknown frequency input signal $f_y$ and a source 30 of reference frequency $f_c$ are both applied to the input of the tuned amplifier 17 by respective summing resistors 31, 32. The tuned amplifier 17 is connected through limiter 18 to the input 19 of discriminator 20 in the customary manner.

The limiter 18 is essential an amplifier whose output becomes constant whenever the grid signal exceeds a predetermined threshold value. This circuit thus operates to limit the peak-to-peak voltage of the output signal to a fixed and predetermined value. A representative limiter circuit employs only a grid leak resistor for biasing a vacuum tube operated with low plate voltage. Consequently the positive peaks of its input signal are clamped at near zero grid volts and the negative peaks exceeding a predetermined amplitude are clipped off since they drive the tube to cutoff. When signals of substantially different magnitudes are simultaneously applied to the grid of this tube, the larger signal develops a large negative bias. Consequently, the output signal frequency is determined only by the signal of larger magnitude since the smaller signal has no effect upon either the grid current flow for positive cycles or the tube cutoff for negative cycles. Specific circuitry for this and the other components of FIG. 3 has not been shown since it is very well known in the art. Reference is made to the text entitled "Electronic Fundamentals and Applications" by John D. Ryder, published in 1950 by Prentice-Hall, Inc.

The wave forms of the unknown input signal $f_y$ and the reference signal $f_c$ bear the relationship shown in FIG. 4. As shown therein, mutually exclusive pulsed-wave (FIG. 4A) and continuous-wave (FIG. 4B) signals are applied to the input of the tuned intermediate frequency amplifier 17, i.e., when $f_y$ is the RF frequency of a pulsed-wave input signal, $f_c$ comprises a continuous-wave input signal and contrariwise when $f_y$ is a continuous-wave input signal, $f_c$ is the RF frequency of a pulsed-wave input signal. In either case, the amplitude of the continuous-wave signal is held substantially below the signal level of the pulsed-wave input signal. The reference signal, whether having a pulsed or continuous waveform, is supplied at a precise frequency at or near the discriminator's center frequency.

The operation of the system of FIG. 3 is as follows: both input signals $f_y$ and $f_c$ are amplified by the tuned amplifier and limited by the limiter 18. When both signals are present, i.e. when a pulse is received, the limiter operates in the manner described above so that the discriminator output is determined only by the larger magnitude pulsed-wave signal. In the interval between the pulses, the discriminator output is determined only by the continuous-wave input signal. Taking the case where the signal of unknown frequency $f_y$ is a pulsed-wave signal, the resultant output of the discriminator is shown in FIG. 4C. The continuous-wave input provides a "D.C." level 35 corresponding to the frequency of the reference signal with respect to the discriminator center frequency. As the input pulses arrive, they cause discriminator output pulses which are positive or negative with respect to this D.C. level dependent upon whether the unknown frequency is respectively less than or greater than the reference frequency. The amplitudes of these pulses measured from the established D.C. reference 35 provide a precise measure of the variation in frequency of the pulsed-wave input signal with respect to the continuous-wave reference signal. If the discriminator center frequency drifts, the relative position of the D.C. level will also drift but the absolute magnitude of the pulses with respect to this level remains unchanged. Consequently, the frequency measurement is independent of discriminator drift. Similarly, if the unknown frequency signal comprises a continuous-wave input signal, the "D.C." level will change accordingly whereas the amplitudes of the voltage pulses of the output are derived from the reference pulsed-wave input signal. The absolute amplitude of the pulses of the output will still provide an accurate measurement of the deviation in frequency of the unknown input from the reference frequency which is independent of discriminator drift.

A novel frequency detection system shown in FIG. 3 may be incorporated in many applications demanding a drift free discriminator. One such embodiment providing a frequency locked, frequency measuring system is shown in FIG. 5. Those components which may be identical to those shown in FIGS. 1 and 3 bear these same identifying numbers. Thus, controller 25, motor 26, mechanical link 27, oscillator 10, frequency measuring device 13, harmonic generator 14 and mixer 15 are coupled together and function in the same manner as in the system of FIG. 1. The output signal $f_y$ of mixer 15 comprises the difference frequency of this prior system and is coupled with the source 30 of reference signal $f_c$ via summing resistors 31, 32 in the manner taught hereinabove and illustrated in FIG. 3. The source 30 of reference signal $f_c$ is selected to provide a continuous-wave input signal when the input signal $f_x$ of unknown frequency has a pulsed-waveform. Respectively opposite wave forms will be provided if the input signal $f_x$ has a continuous-waveform.

The discriminator output signal waveform will be as shown in FIG. 4C. The resultant discriminator output pulses which provide a measurement of the deviation of the difference frequency $f_y$ from the reference frequency $f_c$ independent of discriminator drift are amplified through the A.C. coupled amplifier 40 and detected in detector 41. The resultant D.C. control signal is fed back to the variable oscillator 10 via lead 11 to frequency lock the system. Frequency measuring device 13 then provides a very accurate measurement of the unknown input frequency $f_x$ since the adverse affects of frequency drift within the discriminator 20 are compensated for in the manner described hereinabove.

Although exemplary embodiments have been disclosed and discussed, it will be understood that other applications of the invention are possible and that the embodiments disclosed may be subjected to various changes, modifications and substitutions without departing from the spirit of the invention.

I claim:

1. A frequency detection system for determining the variation in frequency of an input signal from a predetermined frequency value which compensates for errors caused by drift of the frequency discriminator comprising:

means for supplying a reference signal having said predetermined frequency value, said reference frequency signal and said input signal having mutually exclusive pulsed and continuous waveforms, a limiter coupled to said reference signal and said input signal and providing an output signal whose frequency is determined only by the frequency of said pulsed-wave signal when said signal is present and by said continuous-wave signal when said pulsed signal is absent, and a frequency discriminator connected to the output signal of said limiter for converting variations in frequency to variations in amplitude, the output of said discriminator comprising positive or negative pulses depending upon whether the frequency of the unknown input frequency is less than or greater than the reference signal frequency, the magnitude of said pulses being measured with respect to a level established by said continuous-wave signal so that the pulse magnitude provides a precise measurement of the variation in frequency of the input signal from the reference signal frequency independent of drift within the discriminator.

2. A frequency detection system for accurately determining the variation in frequency of an input signal from a predetermined frequency value comprising:

means for supplying a reference signal having said predetermined frequency value, said reference frequency and said input signal having mutually exclusive pulsed and continuous-waveforms, discriminator means for converting variations in frequency from a predetermined frequency value into variations of amplitude, means for coupling said reference signal and said input signal to the input of said discriminator so that said discriminator is responsive only to the pulsed-wave signal when said signal is present and to the continuous-wave signal during the intervals between said pulses, the output of said discriminator comprising a series of pulses whose amplitudes provide a precise measure of the variation in frequency of said input signal from said predetermined reference value.

3. The frequency detection system described in claim 2 wherein:

said means for coupling said reference signal and said input signal to the input of said discriminator comprises a limiter circuti for limiting the peak-to-peak voltage input to the discriminator to a fixed and predetermined value.

4. The frequency detection system described in claim 2 wherein:

said continuous-wave signal is substantially lower in magnitude than said pulsed-wave signal, and said means for coupling said reference signal and said input signal to the input of said discriminator provides an output signal of predetermined magnitude having a frequency determined only by the larger magnitude pulsed-wave signal when both said pulsed-wave and continuous-wave signals are present simultaneously.

5. The frequency detection system described in claim 2 wherein:

the frequency of said reference signal is at substantially the center frequency of said discriminator.

6. The frequency detection system defined in claim 3 wherein:

said means for coupling said reference signal and said input signal includes a tuned intermediate frequency amplifier coupled between said signals and the input of said limiter circuit.

7. In a frequency measuring system, the combination of:

a variable oscillator having an output substantially lower in frequency than the range of frequencies to be measured, means for measuring the output frequency of said variable oscillator, means coupled to said variable oscillator for generating harmonics of said variable oscillator output, means coupled to the output of said harmonic generator means and the frequency to be measured for mixing said input signals and providing the difference frequency therebetween, means for generating a reference frequency signal, one of said reference and said difference frequency signals comprising a pulsed-wave signal and the other of said signals comprising a continuous-wave signal having a lower amplitude than said pulsed-wave signal, means for receiving said reference frequency and said difference frequency signals and providing an output signal of predetermined magnitude having a frequency determined only by the larger magnitude pulsed-wave signal when both said pulsed-wave and continuous-wave signals are present simultaneously, discriminator means connected to said output of predetermined magnitude for converting variations in frequency into variations of amplitude, and means for responsively coupling said variable oscillator to the output of said discriminator means so that said difference frequency is maintained at substantially said reference frequency.

8. The frequency measuring system defined in claim 7 comprising:

an A.C. amplifier and a detector stage connected between the output of said discriminator and the input of said variable oscillator.

9. In a frequency measuring system, the combination of:

a variable oscillator having an output substantially lower in frequency than the range of frequencies to be measured;

means for measuring the output frequency of said variable oscillator;

means connected to the output of said variable oscillator for generating harmonics of said variable oscillator output;

means coupled to said harmonic generator means for mixing the signal whose frequency is to be measured and the output of said harmonic generator means and providing the difference frequency therebetween;

means for generating a reference frequency signal, said reference frequency and said difference frequency signal having mutually exclusive pulsed and continuous-waveforms;

discriminator means for converting variations of frequency into variations of amplitude;

means for coupling said reference signal and said difference signal to the input of said discriminator so that said discriminator is responsive only to the pulsed signal when said signal is present and the continuous-wave input during the intervals between said pulses, and means for coupling the output of said discriminator to said variable oscillator for providing a frequency locked, frequency measuring system.

10. In the frequency measuring system defined in claim 9, said reference frequency signal having a frequency value at or near the center frequency of said discriminator.

11. In the frequency measuring system defined in claim 9, said means for coupling said reference signal and said difference frequency signal to the input of said discriminator comprising a limiter for limiting the peak-to-peak voltage of the discriminator input signal to a fixed and predetermined value.

References Cited by the Examiner

UNITED STATES PATENTS

| | | | |
|---|---|---|---|
| 2,897,450 | 7/1959 | Bailey | 331—18 |
| 2,976,411 | 3/1961 | Kahn | 331—18 X |
| 3,050,693 | 8/1962 | Sinninger | 331—30 X |
| 3,092,780 | 6/1963 | Fisher | 331—16 |

ROY LAKE, *Primary Examiner.*

JOHN KOMINSKI, *Examiner.*